United States Patent
B S et al.

(10) Patent No.: US 11,218,909 B2
(45) Date of Patent: Jan. 4, 2022

(54) ADAPTIVE TRANSMISSION DIRECTION SELECTION IN CELLULAR NETWORK

(71) Applicant: NOKIA SOLUTIONS AND NETWORKS OY, Espoo (FI)

(72) Inventors: Sheshachalam B S, Bangalore (IN); Rajeev Agrawal, Glenview, IL (US); Suresh Kalyanasundaram, Bangalore (IN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/762,875

(22) PCT Filed: Nov. 16, 2017

(86) PCT No.: PCT/EP2017/079461
§ 371 (c)(1),
(2) Date: May 8, 2020

(87) PCT Pub. No.: WO2019/096390
PCT Pub. Date: May 23, 2019

(65) Prior Publication Data
US 2020/0288349 A1 Sep. 10, 2020

(51) Int. Cl.
*H04W 28/08* (2009.01)
*H04W 72/04* (2009.01)

(52) U.S. Cl.
CPC ... *H04W 28/0942* (2020.05); *H04W 28/0812* (2020.05); *H04W 28/0858* (2020.05); *H04W 28/0867* (2020.05)

(58) Field of Classification Search
CPC ..... H04W 16/04; H04W 24/00; H04W 24/02; H04W 24/08; H04W 28/0812;
(Continued)

(56) References Cited

U.S. PATENT DOCUMENTS 7,486,639 B2 * 2/2009 Stanwood ............. H04W 76/11
370/329
8,077,640 B2 * 12/2011 Li ....................... H04W 72/087
370/280
(Continued)

FOREIGN PATENT DOCUMENTS

WO WO-0227970 A1 * 4/2002 ............ H04W 16/28

OTHER PUBLICATIONS

International Search Report and Written Opinion dated Jul. 17, 2018 corresponding to International Patent Application No. PCT/US2017/079461.

*Primary Examiner* — Ahmed Elallam
(74) *Attorney, Agent, or Firm* — Squire Patton Boggs (US) LLP

(57) ABSTRACT

This document discloses a solution for selecting a transmission direction in a cell. A method comprises: determining, by a controller associated with a cell of a cellular communication system, a traffic asymmetry metric for the cell, the traffic asymmetry metric representing asymmetry between uplink and downlink traffic in the cell; comparing, by the controller, the traffic asymmetry metric with a threshold; upon determining, by the controller on the basis of the comparison, that the traffic asymmetry metric is one of greater and lower than the threshold, selecting a first transmission direction for a time interval; upon determining, by the controller on the basis of the comparison, that the traffic asymmetry metric is the other one of greater and lower than the threshold, selecting for the time interval a second transmission direction different from the first transmission direction, wherein the second transmission direction is a nominal transmission direction determined as common to a cell cluster comprising the cell and a set of neighboring cells, and wherein the controller determines the nominal transmission direction on the basis of traffic condition metrics acquired for the cell and (Continued)

for the set of neighboring cells; and causing data communication to the selected transmission direction in the cell during the time interval.

20 Claims, 5 Drawing Sheets

(58) Field of Classification Search
CPC ......... H04W 28/0858; H04W 28/0867; H04W 28/0942; H04W 28/0231; H04W 28/08; H04W 72/082; H04W 72/0426; H04W 72/044; H04W 72/0446; H04W 72/0486; H04W 72/1242; H04L 5/0073
See application file for complete search history.

(56) References Cited

U.S. PATENT DOCUMENTS

| | | |
|---|---|---|
| 9,288,797 B2 * | 3/2016 | Khoryaev ............. H04L 1/1607 |
| 9,615,378 B2 * | 4/2017 | Khoryaev ............. H04L 47/283 |
| 10,306,656 B2 * | 5/2019 | Zhu ........................ H04L 1/1812 |
| 2015/0055517 A1 | 2/2015 | Samdanis et al. |
| 2017/0099130 A9 * | 4/2017 | Khoryaev ........ H04N 21/25841 |
| 2017/0280467 A1 | 9/2017 | Zhu et al. |
| 2020/0107202 A1 * | 4/2020 | Teng ......................... H04L 5/14 |
| 2020/0145175 A1 * | 5/2020 | Hassan Hussein ... H04W 72/10 |

* cited by examiner

ADAPTIVE TRANSMISSION DIRECTION SELECTION IN CELLULAR NETWORK

FIELD

The invention relates to a cellular network that is capable of switching transmission direction on a timely basis and, in particular, to adaptive transmission direction selection in such a network.

BACKGROUND

Time-division duplexing (TDD) is a mechanism where dedicated time resources are allocated to uplink and downlink transmission directions. In a modern cellular TDD network, an access node or a base station may configure fixed uplink time resources, fixed downlink resources, and flexible uplink/downlink resources. With the flexible uplink/downlink resources, an actual transmission direction may be selected according to a criterion. Flexible uplink/downlink resources enables an individual cell to independently decide its transmission direction in each time slot, multiple slots, sub-frame, with another granularity. This facilitates adaptation to fast-varying traffic demands in each transmission direction. However, this additional flexibility comes at a cost. It poses new interference scenarios because different cells may select different transmission directions for a given time interval.

BRIEF DESCRIPTION OF THE INVENTION

The invention is defined by the subject-matter of the independent claims. Embodiments are defined in the dependent claims.

LIST OF DRAWINGS

In the following, the invention will be described in greater detail with reference to the embodiments and the accompanying drawings, in which FIG. 1 illustrates a layout of a cellular communication system to which embodiments of the invention may be applied;

DESCRIPTION OF EMBODIMENTS

Figure 1:
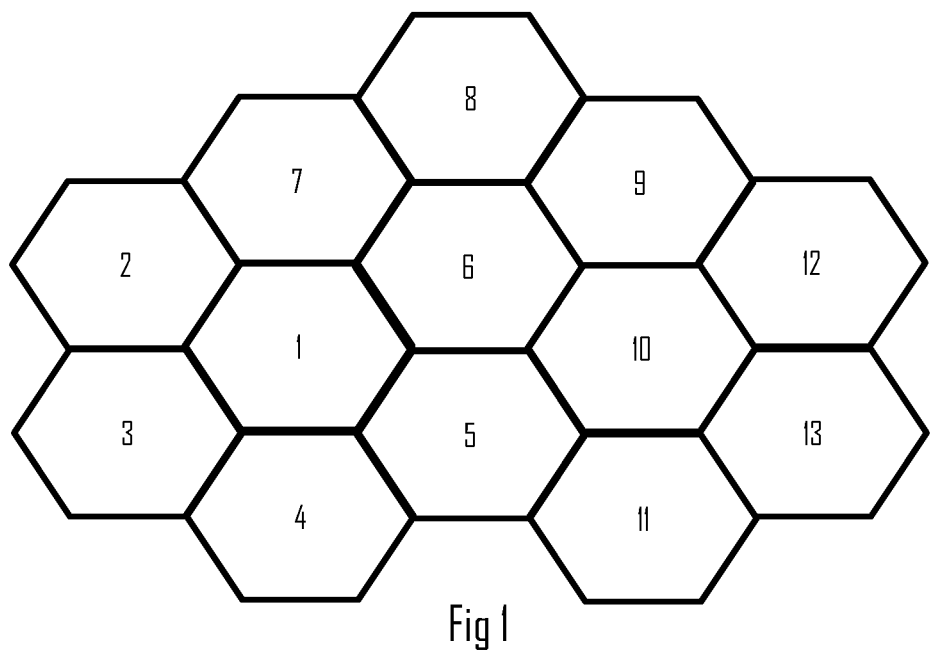

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments described may be implemented in a radio system, such as in at least one of the following: Universal Mobile Telecommunication System (UMTS, 3G) based on basic wideband-code division multiple access (W-CDMA), high-speed packet access (HSPA), Long Term Evolution (LTE), LTE-Advanced, a system based on IEEE 802.11 specifications, a system based on IEEE 802.15 specifications, and/or a fifth generation (5G) mobile or cellular communication system The embodiments are not, however, restricted to the system given as an example but a person skilled in the art may apply the solution to other communication systems provided with necessary properties. One example of a suitable communications system is the 5G system, as listed above. 5G has been envisaged to use multiple-input-multiple-output (MIMO) multi-antenna transmission techniques, more base stations or nodes than the current network deployments of LTE, by using a so-called small cell concept including macro sites operating in co-operation with smaller local area access nodes and perhaps also employing a variety of radio technologies for better coverage and enhanced data rates. 5G will likely be comprised of more than one radio access technology (RAT), each optimized for certain use cases and/or spectrum. 5G system may also incorporate both cellular (3GPP) and non-cellular (e.g. IEEE) technologies. 5G mobile communications will have a wider range of use cases and related applications including video streaming, augmented reality, different ways of data sharing and various forms of machine type applications, including vehicular safety, different sensors and real-time control. 5G is expected to have multiple radio interfaces, including apart from earlier deployed frequencies below 6 GHz, also higher, that is cmWave and mmWave frequencies, and also being capable of integrating with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as inter-RI operability between cmWave and mmWave). One of the concepts considered to be used in 5G networks is network slicing in which multiple independent and dedicated virtual sub-networks (network instances) may be created within the same infrastructure to run services that have different requirements on latency, reliability, throughput and mobility.

FIG. 1 illustrates an example of a layout of a cellular communication system to which some embodiments of the invention may be applied. The system may comprise one or more access nodes providing and managing respective cells 1 to 13. The cell may be, e.g., a macro cell, a micro cell, femto, or a pico cell, for example. From another point of view, the cell may define a coverage area or a service area of the access node. FIG. 1 illustrates a typical macro cell layout where the cells are illustrated as non-overlapping hexagonals. In real life, the coverage areas of the cells may overlap and cells may be provided within cells, e.g. a femto cell within a macro cell. Overly simplified illustration is, however, preferred herein so as not to obscure the invention with details.

The access node may be an evolved Node B (eNB) as in the LTE and LTE-A, an access point of an IEEE 802.11-based network (Wi-Fi or wireless local area network, WLAN), a next generation eNB (gNB), or any other apparatus capable of controlling radio communication and managing radio resources within a cell. For 5G solutions, the implementation may be similar to LTE-A, as described above. The access node may equally be called a base station or a network node. The system may be a wireless communication system composed of a radio access network of access nodes, each controlling a respective cell or cells. The access nodes may provide terminal devices (UEs) with wireless access to other networks such as the Internet. The terminal device may also be called a station or a wireless device.

In the case of multiple access nodes in the communication network, the access nodes may be connected to each other with an interface. LTE specifications call such an interface as X2 interface. In IEEE 802.11 networks, a similar interface is provided between access points. An LTE access node and a WLAN access node may be connected, for example via Xw interface. Other wired or wireless communication methods between the access nodes may also be possible. The access nodes may be further connected via another interface to a core network 130 of the cellular communication system. The LTE specifications specify the core network as an evolved packet core (EPC), and the core network may comprise a mobility management entity (MME), and a gateway (GW) node. The MME may handle mobility of terminal devices in a tracking area encompassing a plurality of cells and also handle signalling connections between the terminal devices and the core network 130. The MME may further carry out authentication and integrity protection for terminal devices 110, 112. The gateway node may handle data routing in the core network 130 and to/from the terminal devices. In an embodiment, the gateway node is replaced by a group of gateway nodes, such as in the LTE networks. In the LTE networks, a serving gateway (SGW) node is configured to assign a suitable packet data network gateway (PGW) for the terminal devices to serve a data session. The gateway node may connect to other communication networks such as the Internet.

The radio system of FIG. 1 may support Machine Type Communication (MTC). MTC may enable providing service for a large amount of MTC capable devices, such as the at least one terminal device. The at least one terminal device may comprise a mobile phone, smart phone, tablet computer, laptop or other devices used for user communication with the radio communication network, such as an MTC network. These devices may provide further functionality compared to the MTC scheme, such as communication link for voice, video and/or data transfer. However, in MTC perspective the at least one terminal device may be understood as a MTC device. It needs to be understood that the at least one terminal device may also comprise another MTC capable device, such as a sensor device providing position, acceleration and/or temperature information to name a few examples. Some embodiments of the invention may thus be applicable to Internet of Things (IoT) systems, e.g. a radio access technology supporting a narrowband IoT (NB-IoT) communication scheme.

The system of FIG. 1 may be a time-division duplexing (TDD) system where uplink and downlink traffic is transmitted at different, non-overlapping time intervals. As discussed in the Background, it would be advantageous to provide a mechanism where the transmission direction may be selected flexibly in each cell. However, such a solution may cause interference amongst neighbouring cells when the cells select different transmission directions for a given time interval.

Figure 2:
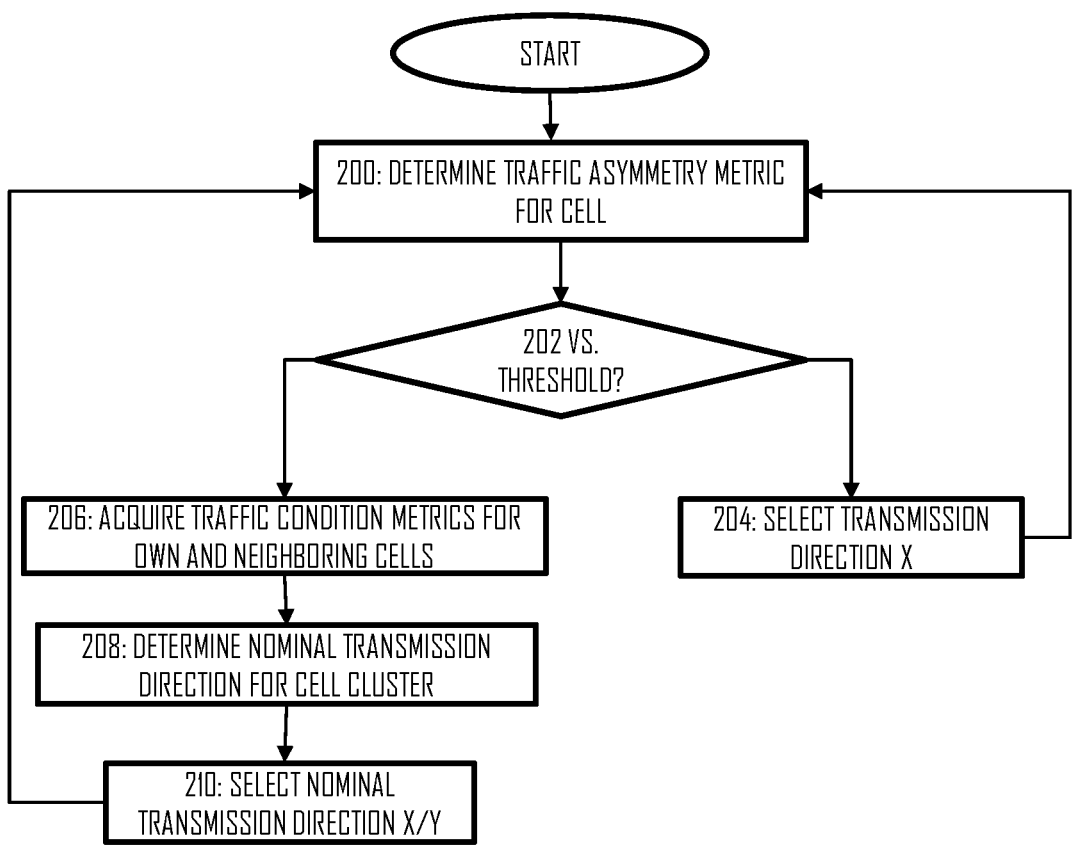
FIGS. 2 and 3 illustrate flow diagrams of processes for selecting a transmission direction according to some embodiments of the invention.

FIG. 2 illustrates an embodiment of a process for selecting a transmission direction for a time interval. Referring to FIG. 2, the process comprises in a controller configured to select transmission directions for a cell of a cellular communication system: determining (block 200) a traffic asymmetry metric for the cell, the traffic asymmetry metric representing asymmetry between uplink and downlink traffic in the cell; comparing (block 202) the traffic asymmetry metric with a threshold; upon determining, on the basis of the comparison, that the traffic asymmetry metric is one of greater and lower than the threshold, selecting (block 204) a first transmission direction for a time interval; and upon determining, on the basis of the comparison, that the traffic asymmetry metric is the other one of greater and lower than the threshold, selecting (block 210) for the time interval a second transmission direction different from the first transmission direction, wherein the second transmission direction is a nominal transmission direction determined as common to a cell cluster comprising the cell and a set of neighboring cells, and wherein the controller determines (block 208) the nominal transmission direction on the basis of traffic condition metrics acquired (block 206) for the cell and for the set of neighboring cells; and causing data communication to the selected transmission direction in the cell during the time interval.

In an embodiment, the time interval is a time slot of a radio frame. In an embodiment, the time interval is a sub-frame of a radio frame. In an embodiment, the time interval is 10 milliseconds (ms) or shorter than 10 ms.

In an embodiment, the process of FIG. 2 is executed by a controller comprised in an access node managing the cell. In another embodiment, the process of FIG. 2 is executed by a controller external to the access node. Modern cellular communication employ cloud computing where a centralized computer may perform the process of FIG. 2 collectively for multiple cells, e.g. for cells 1 to 7. In an implementation, different processors or processor cores may perform the process of FIG. 2 for different cells.

In an embodiment, an independent decision is made for each cell 1 to 13. For that purpose, let us define the notion of the cell cluster. Instead of using a fixed cell cluster where each cell belongs to only one fixed cell cluster, an embodiment employs 'liquid clustering" The cell for which the transmission direction is performed, may first determine the cells of the cell cluster. Typically, the cells include the immediate neighbors, e.g. cells 2 to 7 for cell 1 in FIG. 1. However, other cells may be involved depending on a radio interference scenario. Inter-cell interference may be measured by the cell and the neighboring cells from which interference above a threshold is detected may be selected in the cell cluster. The cell cluster may also be selected for each cell independently which creates the liquid clustering concept. Different cells typically select different cell clusters. For example, cells 1 to 7 may be selected for a cell cluster of cell 1 while cells 1 and 5 to 10 may be selected for a cell cluster of cell 6. Cell 10 may experience high interference from cell 7 and have in its cell cluster cells 5, 6, 7, 9, and 10 to 13.

Figure 3:
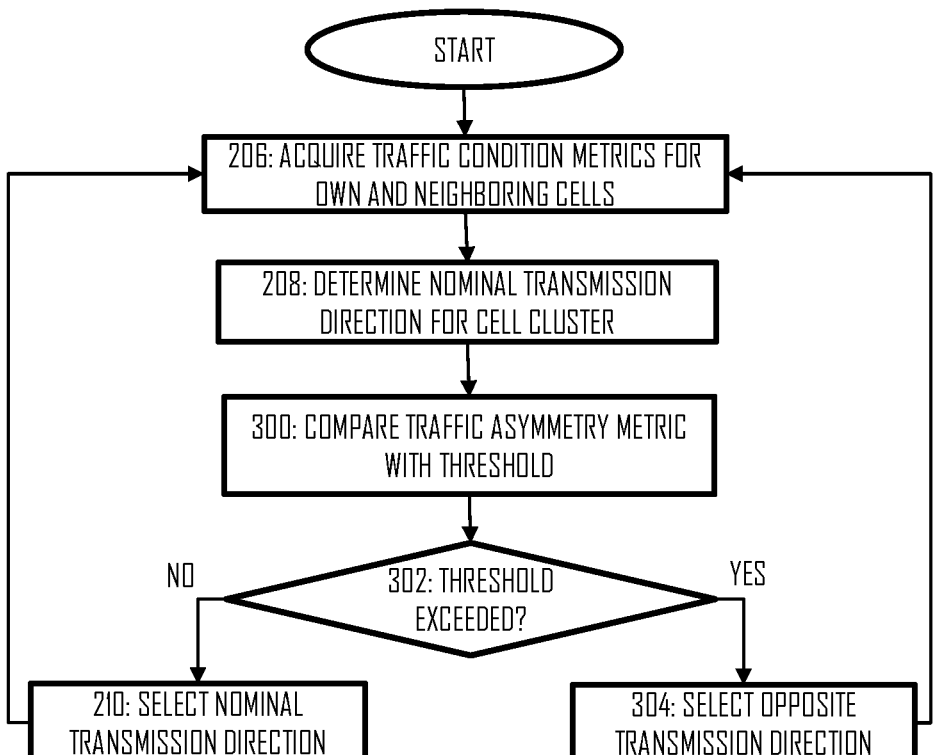

FIG. 3 illustrates an embodiment of FIG. 2 for selecting the transmission direction. The process of FIG. 3 includes partially the same steps as the process of FIG. 2, as illustrated by the same reference numbers. Referring to FIG. 3, the controller may first acquire (block 206) the traffic condition metrics for the cells of the cell cluster. Then, the controller may determine the nominal transmission direction for the cell cluster (block 208) on the basis of the traffic condition metrics. Then, the controller may compare (block 300, 302) the traffic asymmetry metric of the cell with the threshold. If the threshold is exceeded such that the traffic asymmetry metric indicates a high need for selecting the transmission direction opposite to the nominal transmission direction, the controller selects the opposite transmission direction (block 304). If the threshold is not exceeded, the nominal transmission direction may be selected (block 210).

In the embodiments of FIGS. 2 and 3, the controller may select the nominal transmission direction unless there are severe traffic asymmetry conditions in the cell that justify the selection of the opposite transmission direction. The degree of required severity for choosing the opposite transmission direction is controlled by the value of the threshold. The threshold may be preset and defined by an operator of the cellular communication system, for example.

In an embodiment, the value of the threshold is fixed. In another embodiment, the value of the threshold is tunable. For example, the value of the threshold may be determined on the basis of a measured interference scenario.

As described above, an independent decision of the transmission direction is made for each cell 1 to 13. However, neighboring cells typically use partially the same cells in the cell cluster and, therefore, it is probable that there is correlation As illustrated in FIGS. 2 and 3, the transmission direction selection may be a repeated process. The execution of the process may be periodic per 'n time intervals, where n≥1, or it can be event-triggered. The event may be an observed change in operational conditions of the cell or the cellular communication system, or the event may be any other event than a direct timer event. In the embodiments, muting the time interval may be used as an alternative to blocks 204 and 210 (FIG. 2) or blocks 304 and 210 (FIG. 3). Upon a determined criterion is satisfied, e.g. in the threshold comparison, the muting may be selected.

The traffic condition metrics for the neighboring cells may be received from the neighboring cells of the cell cluster. On the basis of the traffic condition metrics for the own and neighboring cells, the nominal transmission direction may be computed, as described above. The controller may further compute the traffic asymmetry metric from the traffic conditions metrics of the own cell to determine the local traffic conditions. The controller then computes the transmission direction by checking, in the threshold comparison, if the degree of traffic asymmetry in favor of the opposite transmission direction in its own cell is larger than the threshold. If the condition is found to be true, the controller chooses to violate the nominal transmission direction determined as the common transmission direction for the cell cluster. Otherwise, it follows the nominal transmission direction.

The traffic condition metrics may indicate traffic conditions in the respective cell. The traffic condition metrics may be measured by an access node and/or one or more terminal devices of the respective cell. Several embodiments are described below. The traffic conditions metrics may alone, or as combined, indicate the traffic asymmetry in the respective cell. For example, the traffic condition metrics for a cell may comprise an uplink traffic condition metric and a downlink traffic condition metric, and the uplink traffic condition metric and downlink traffic condition metric together indicated the traffic asymmetry.

Figure 4:
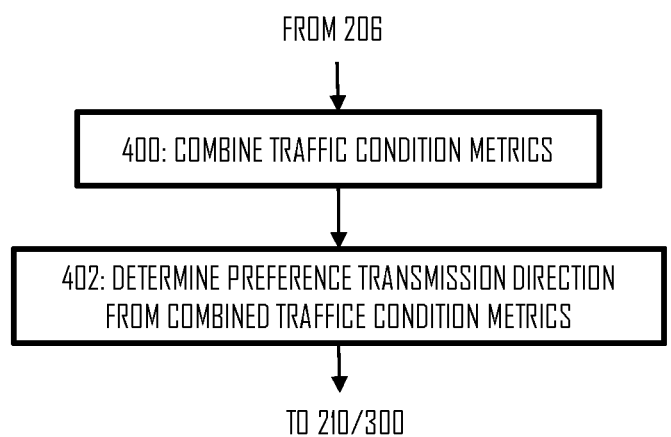
FIG. 4 illustrates an embodiment for combining traffic condition metrics used in the selection of the transmission direction.

FIG. 4 illustrates an embodiment of block 208. Upon acquiring the traffic condition metrics for the cell cluster, including the traffic condition metrics for the own and neighboring cells, the controller may combine the traffic condition metrics in block 400. Several embodiments for the combining are described below. The combined traffic condition metrics may indicate the general traffic asymmetry requirement in the cell cluster. Thereafter, the controller may determine a preference transmission direction from this asymmetry requirement for the time interval and select the preference transmission direction as the nominal transmission direction.

Next, let us describe how different traffic condition metrics may be employed in the selection of the transmission direction with reference to FIGS. 5 to 9. The embodiments of FIGS. 5 to 9 are subjected to the procedure of FIG. 3 but they can be directly applied to the embodiment of FIG. 2 as well. The threshold in both embodiments may be the same and both embodiments are applicable to all traffic condition metrics described in FIGS. 5 to 9.

Figure 5:
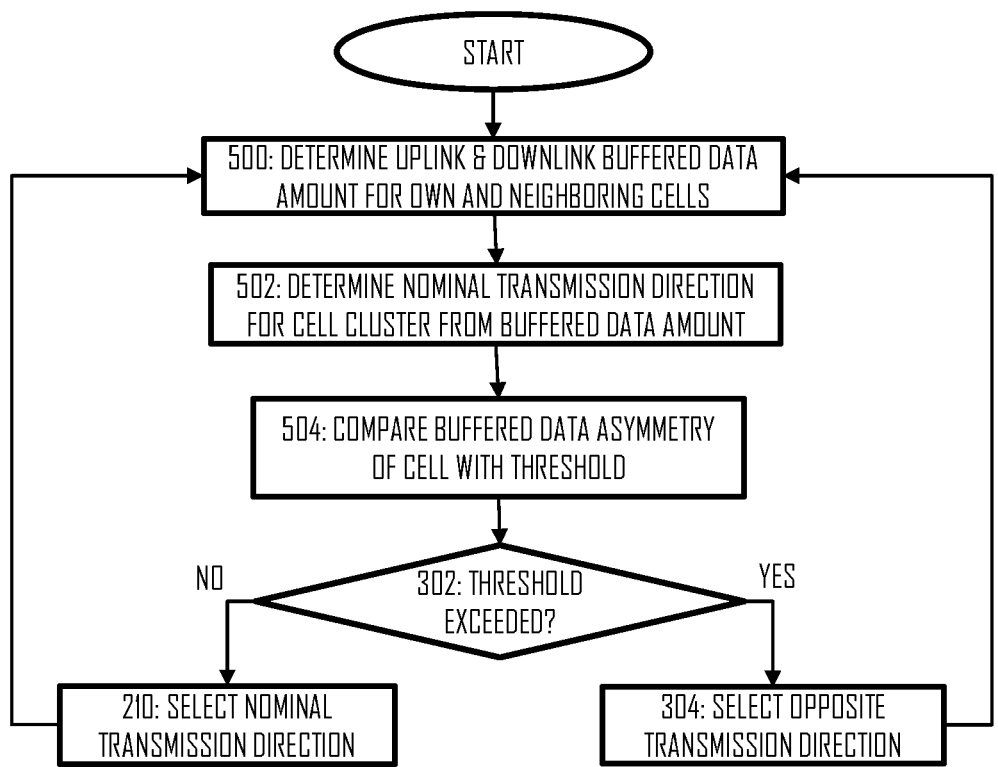
FIGS. 5 to 9 illustrate embodiments for selecting the transmission direction by using various traffic condition metrics.

In the embodiment of FIG. 5, each traffic condition metric represents a buffered data amount associated with a transmission direction in a cell. In an embodiment, each traffic condition metric represents a sum of buffered data amount associated with each transmission direction in a cell. The transmission directions may include uplink (from a terminal device to an access node) and downlink (from the access node to the terminal device). Accordingly, an uplink traffic condition metric for cell 1 may be defined as a sum of buffered uplink data amount in cell 1. Similarly, a downlink traffic condition metric for cell 1 may be defined as a sum of buffered downlink data amount in cell 1. Similar approach may be applied to the other cells. An access node may gather the information on the buffered downlink data amount by checking how much data has been buffered in its downlink data buffer. The access node may gather the information on the buffered uplink data amount from buffer status reports received from terminal devices served by the access node in the respective cell.

Referring to FIG. 5, the controller may determine the amount of buffered uplink and downlink data amount for the cells of the cell cluster (block 500). Then, the controller may perform the following check:

$$\sum_{k \in C_i} \sum_{j=1}^{n_k^d} B_{k,j}^d \geq \sum_{k \in C_i} \sum_{j=1}^{n_k^u} B_{k,j}^u \qquad (1)$$

where $C_i$ is the cell cluster of cell i for which the process of FIG. 5 is being performed, $n_k^x$ is the number of active terminal devices having traffic in transmission direction $x \in \{u, d\}$ in cell k, $B_{k,j}^x$ is e size of the data in the buffer for terminal device j in cell k in transmission direction $x \in \{u, d\}$, where u and d denote uplink and downlink, respectively.

If the condition of Equation (1) is satisfied, the controller may select the downlink as the nominal transmission direction in block 502. Otherwise, the controller may select the uplink as the nominal transmission direction in block 502. In general, the controller may select, as the nominal transmission direction, a transmission direction for which a larger amount of buffered data is determined to be present in the cell cluster.

In the embodiment of FIG. 5, the controller receives the values of $$\sum_{j=1}^{n_k^d} B_{k,j}^d \text{ and } \sum_{j=1}^{n_k^u} B_{k,j}^u$$

k≠i, from the neighboring cells of the cell cluster $C_i$. Additionally, the controller computes $$\sum_{j=1}^{n_k^d} B_{k,j}^d \text{ and } \sum_{j=1}^{n_k^u} B_{k,j}^u$$

k=i for its own cell i. In this embodiment, the traffic asymmetry metric represents asymmetry between an amount of buffered uplink data and an amount of buffered downlink data in the cell, and wherein the controller selects the first transmission direction when the asymmetry is greater than a determined degree defined by the threshold.

Let us denote the amount of buffered data for the nominal transmission direction y as $$B_i^y = \sum_{j=1}^{n_i^y} B_{i,j}^y.$$

In a similar manner, the amount of buffered data for the opposite transmission direction x as $$B_i^x = \sum_{j=1}^{n_i^x} B_{i,j}^x.$$

Now, the traffic asymmetry metric may be defined as a relation of $B_i^x$ and $B_i^y$. The relation may be a difference or a ratio between $B_i^x$ and $B_i^y$. The controller then compares the traffic asymmetry metric with the threshold in block 504 and, if the traffic asymmetry exceeds the threshold towards the opposite transmission direction, the controller proceeds to block 304. For example, if the ratio of the sum of buffer sizes of all terminal devices in the direction opposite to the notional common transmission direction in the cell i with respect to the sum of buffer sizes of all terminal devices in the nominal transmission direction in the cell i exceeds the threshold, then controller violates the nominal transmission direction and chooses the opposite transmission direction.

As another example of the use of traffic asymmetry metric, another combination of $B_i^x$ and $B_i^y$ may be used. For example, if $B_i^y=0$, $B_i^z>0$, ($z \neq y$; $z \in \{u, d\}$), the controller may selects the opposite transmission direction z.

Figure 6:
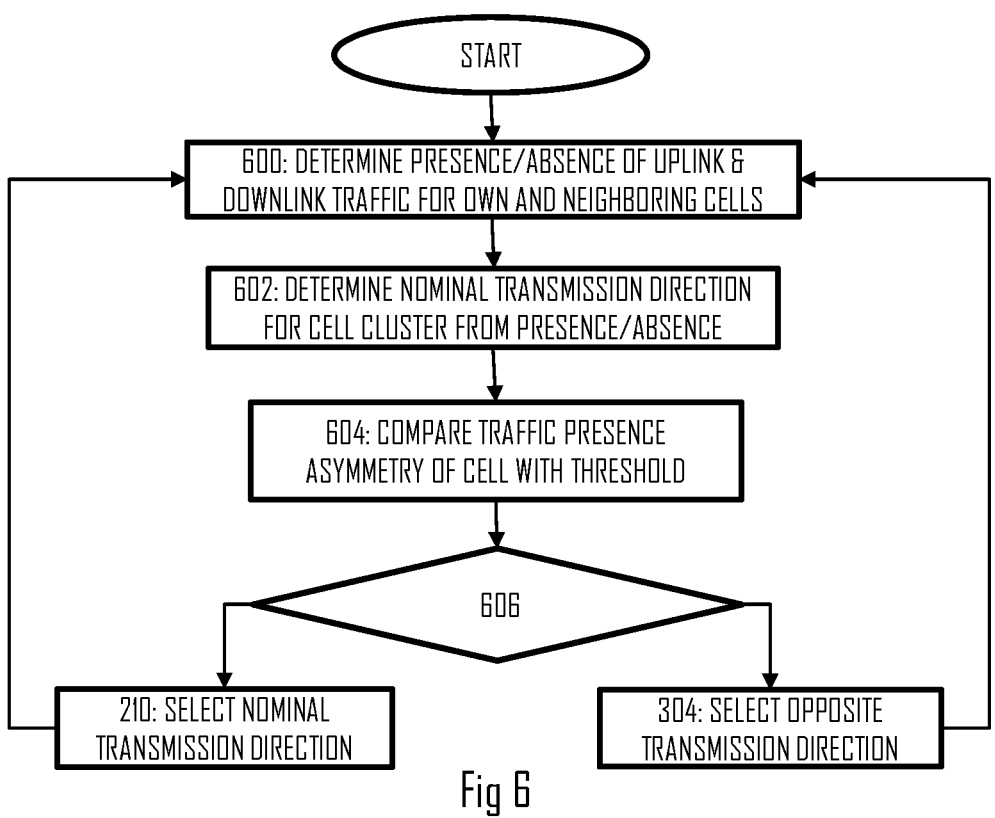

In the embodiment of FIG. 6, each traffic condition metric represents presence or absence of data traffic associated with a transmission direction in the cell i. The traffic condition metric may be a binary indicator indicating the presence/absence of traffic in a transmission direction. Each cell may thus provide two traffic condition metrics, an uplink traffic condition metric and a downlink traffic condition metric. Referring to FIG. 6, the controller determines in block 600 the presence/absence of uplink and downlink traffic in the cells of the cell cluster. In block 602, the controller determines the nominal transmission direction by selecting a transmission direction for which a greater number of traffic condition metrics indicates presence of data traffic in the cell cluster. Block 602 may be carried out by using the following Equation:

$$\eta = \frac{\alpha \sum_{k \in C_i} I_{\left\{\sum_{j=1}^{n_k^u} B_{k,j}^u = 0, \sum_{j=1}^{n_k^d} B_{k,j}^d > 0\right\}} + \beta \sum_{k \in C_i} I_{\left\{\sum_{j=1}^{n_k^u} B_{k,j}^u > 0, \sum_{j=1}^{n_k^d} B_{k,j}^d > 0\right\}}}{\alpha \sum_{k \in C_i} I_{\left\{\sum_{j=1}^{n_k^u} B_{k,j}^u > 0, \sum_{j=1}^{n_k^d} B_{k,j}^d = 0\right\}} + \beta \sum_{k \in C_i} I_{\left\{\sum_{j=1}^{n_k^u} B_{k,j}^u > 0, \sum_{j=1}^{n_k^d} B_{k,j}^d > 0\right\}}} \quad (2)$$

where I is the binary indicator that takes a first value when the condition in its subscript is satisfied and a second, different value otherwise. If we look at the numerator of Equation (2), the first factor scaled by α represents a sum of cells having downlink traffic, while the second factor scaled by β represents a sum of cells having downlink traffic and uplink traffic. If we look at the denominator of Equation (2), the first factor scaled by α represents a sum of cells having uplink traffic, while the second factor scaled by β represents a sum of cells having downlink traffic and uplink traffic. The scaling factors α and β may be used to weight the operators differently. For example, if the operator wants to put a higher weight on the contribution of the cells having traffic to only one transmission direction, α>β. If the operator wants to put a higher weight to the contribution of the cells having traffic to only one transmission direction, α<β. If η≥threshold, e.g. 0.5, downlink may be selected as the nominal transmission direction. Otherwise, the uplink may be selected as the nominal transmission direction. Please note that Equation (2) may be generalized by replacing u=x and d=y.

In the embodiment of FIG. 6, the traffic asymmetry metric represents asymmetry between presence of uplink data traffic and downlink data traffic in the cell i, and the controller may select the opposite transmission direction when the asymmetry is greater than a determined degree defined by the threshold. For example, the controller may compute for the cell i the following Equation in block 604:

$$i = \frac{I_{\left\{\sum_{j=1}^{n_i^u} B_{i,j}^u = 0, \sum_{j=1}^{n_i^d} B_{i,j}^d > 0\right\}} + I_{\left\{\sum_{j=1}^{n_i^u} B_{i,j}^u > 0, \sum_{j=1}^{n_i^d} B_{i,j}^d > 0\right\}}}{I_{\left\{\sum_{j=1}^{n_k^u} B_{i,j}^u > 0, \sum_{j=1}^{n_k^d} B_{i,j}^d = 0\right\}} + I_{\left\{\sum_{j=1}^{n_k^u} B_{i,j}^u > 0, \sum_{j=1}^{n_k^d} B_{i,j}^d > 0\right\}}} \quad (3)$$

By using this Equation, the controller selects the downlink transmission, if the result of the Equation (3) is above the threshold. For example, if the denominator becomes zero (no uplink traffic), the Equation results in positive infinity. If there is both uplink and downlink traffic, the result is 1. If there is only uplink traffic, the result is 0. The controller may then employ in block 604 and 606 two thresholds $TH_1$ and $TH_2$, where $0 \leq TH_1 \leq TH_2$. If $i \leq TH_1$, the controller selects the uplink transmission direction. If $TH_1 \leq i \leq TH_2$, the controller selects the nominal transmission direction. If $i \geq TH_2$, the controller selects the downlink transmission direction. In an embodiment, $TH_2 > 1$ and $0 < TH_1 < 1$. Please note that Equation (3) may be generalized by replacing u=x and d=y.

In other words, the controller may select the opposite transmission direction, if it has present data traffic only to the opposite transmission direction and no data traffic to the nominal transmission direction. Otherwise, it may select the nominal transmission direction.

Figure 7:
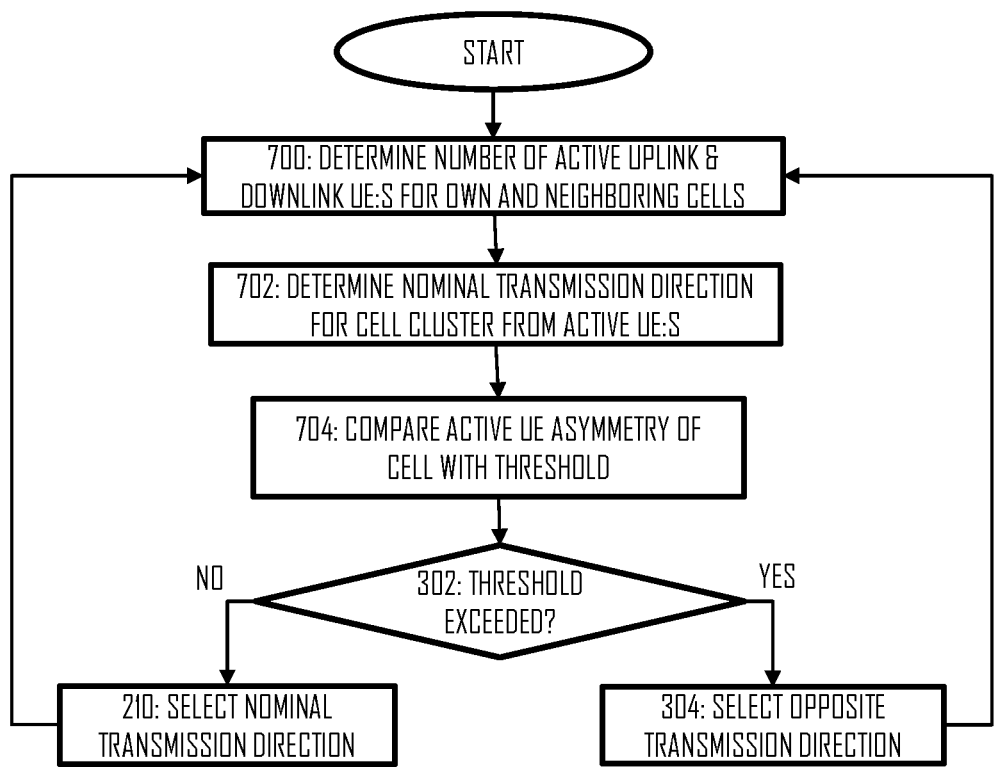

In the embodiment of FIG. 7, each traffic condition metric represents a number of active terminal devices having traffic associated with a transmission direction in a cell. The controller determines in block 700 the number of active uplink terminal devices and the number of active downlink terminal devices in the cells of the cell cluster. The controller may then perform the following check:

$$\Sigma_{k \in Ci} n_k^d \geq \Sigma_{k \in Ci} n_k^u \quad (4)$$

where $n_k^x$ represents the number of active terminal devices in the transmission direction x ($x \in \{u, d\}$). A terminal device may be determined to be active if it has a radio resource control (RRC) connection with the access node and has buffered uplink/downlink data for transmission. If the condition of Equation (4) is satisfied, the controller determines the downlink as the nominal transmission direction in block 702. Otherwise, it selects the uplink as the nominal transmission direction. Please note that Equation (2) may be generalized by replacing u=x and d=y. In general, the controller selects, as the nominal transmission direction, a transmission direction associated with a greater number of active terminal devices in the cell cluster.

In the embodiment of FIG. 7, the traffic asymmetry metric represents asymmetry between a number of active terminal devices having uplink data traffic a number of active terminal devices having downlink data traffic in the cell i, and the controller selects the opposite transmission direction when the asymmetry is greater than a determined degree defined by the threshold, as determined in blocks 604, 302. For example, if $n_i^y=0$ and $n_i^z>0$ (only active terminal devices to the opposite transmission direction z), the controller may select the opposite transmission direction z. If the cell has active terminal devices to be served in both transmission directions, then the controller uses the nominal transmission direction unless the number of active terminal devices to the opposite transmission direction with respect to the number of active terminal devices to the nominal transmission direction exceeds the threshold value.

Figure 8:
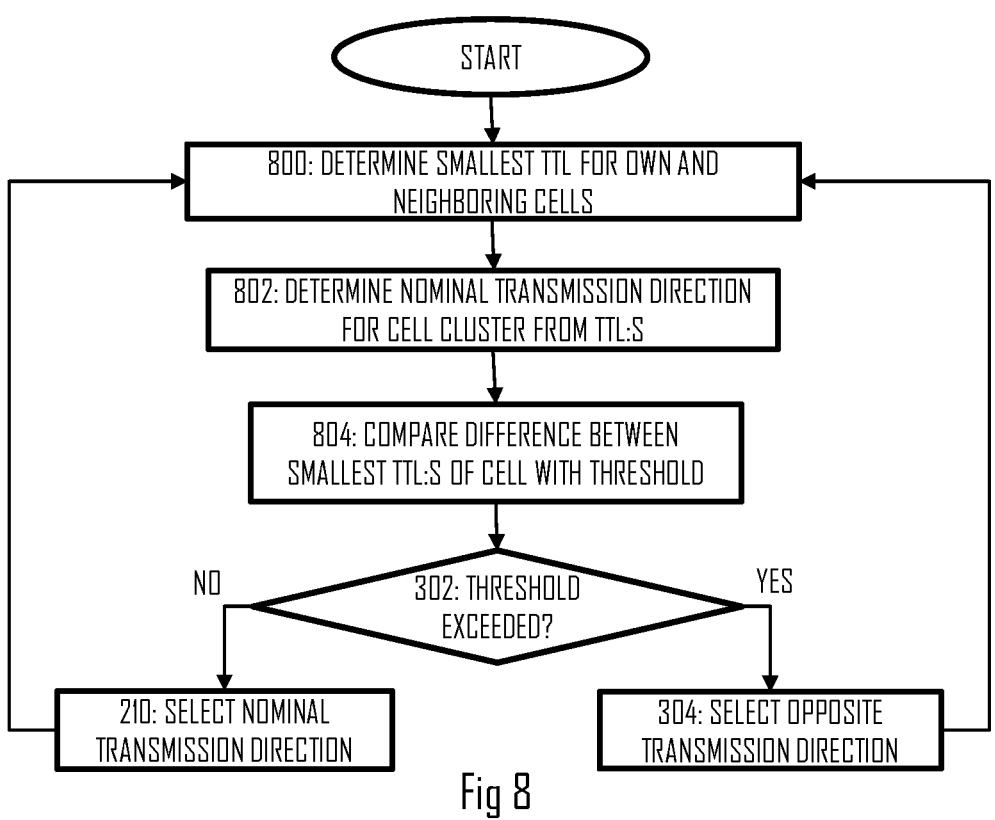

In the embodiment of FIG. 8, each traffic condition metric represents a smallest lifetime amongst buffered data packets associated with a transmission direction in a cell. This lifetime is also called "time-to-live" (TTL) of a data packet in some contexts. It represents the remaining lifetime of the data packet. Upon expiry of the lifetime, the data packet may be discarded from a buffer. In block 800, the controller may determine the smallest lifetime for each transmission direction in each cell of the cell cluster. The controller may receive the smallest uplink lifetime and the smallest downlink lifetime from each cell of the cell cluster. Then, the controller may in block 802 determine the nominal transmission direction by selecting a transmission direction associated with a smallest aggregate lifetime of buffered data packets in the cell cluster. The smallest aggregate lifetime may be computed as an aggregate of the traffic condition metrics associated with the same transmission direction. Let $\tau_k^d$ and $\tau_k^u$ represent the smallest lifetime values among all packets across all terminal devices served by cell k in downlink and uplink, respectively. The nominal transmission direction may be selected in block 802 by using the following relation:

$$\Sigma_{k \in Ci} \tau_k^d \leq \Sigma_{k \in Ci} \tau_k^u \quad (5)$$

If the condition is satisfied, downlink is selected as the nominal transmission direction. Otherwise, uplink is selected as the nominal transmission direction. Please note that Equation (5) may be generalized by replacing u=x and d=y.

In the embodiment of FIG. 8, the traffic asymmetry metric represents a relation between the smallest lifetime amongst uplink data packets and the smallest lifetime amongst downlink data packets in the cell, and wherein the controller selects the first transmission direction when the relation indicates difference greater than a determined degree defined by the threshold. Let us define $\tau_i^y$ as the lowest lifetime value across all the terminal devices in cell i in the nominal transmission direction y, and $\tau_i^z$ as the lowest lifetime value across all terminal devices in cell i in the opposite transmission direction z ($z \neq y$; $z \in \{u, d\}$). If the relation such as the ratio $\tau_i^z/\tau_i^y$ is smaller than the threshold (blocks 804, 302 in FIG. 8), the controller selects the opposite transmission direction. Otherwise, it selects the nominal transmission direction y. In other words, the controller may use the nominal transmission direction unless the smallest lifetime of a data packet to the opposite transmission direction has significantly shorter lifetime than the smallest lifetime of a data packet to the nominal transmission direction.

In an embodiment, the controller may use the nominal transmission direction unless there exists at least one data packet having a lifetime smaller than the threshold in the cell i.

Figure 9:
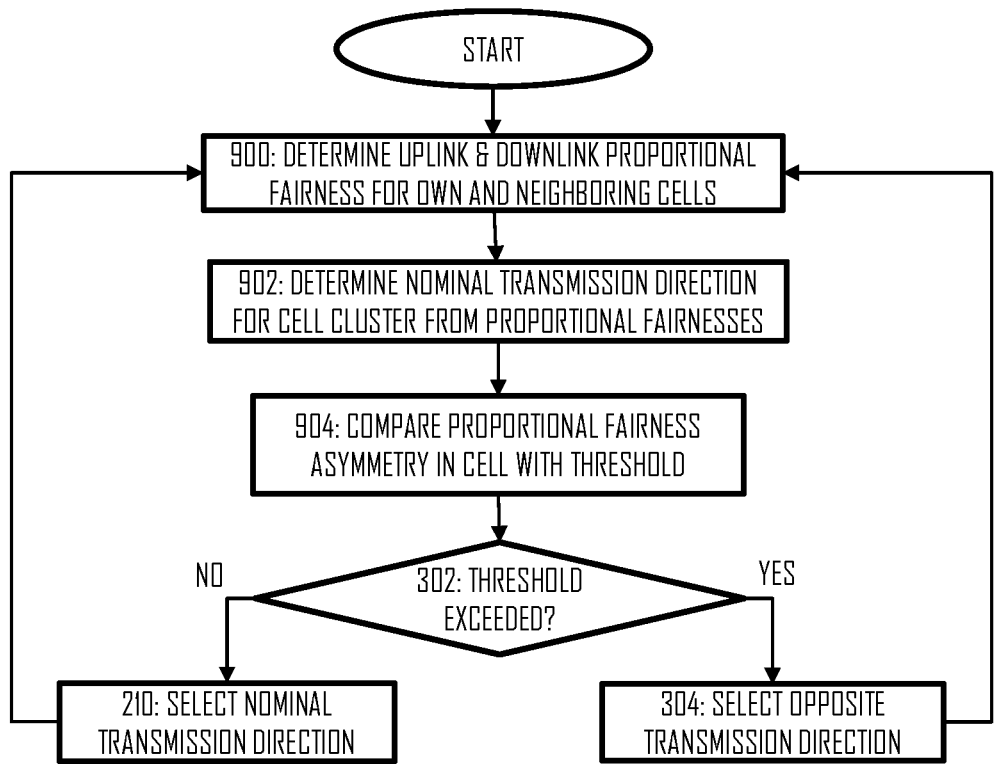

In the embodiment of FIG. 9, each traffic condition metric represents a proportional fairness associated with a transmission direction in a cell, wherein the proportional fairness represents a grade of service provided by the cell with respect to a maximum achievable grade of service in the cell. The proportional fairness PF for a terminal device may be defined as:

$$PF = \frac{\text{Achievable throughput}}{\text{Realized throughput}} \quad (6)$$

The proportional fairness is thus a figure that represents how well the cell has served the terminal device with respect to the best possible service achievable for the terminal device. By using the relation of Equation (6), a higher value of the proportional fairness metric indicates poorer grade of service with respect to the maximum achievable grade of service. The PF is a figure computed to represent a long-term fairness in time/frequency resource allocation across multiple terminal devices over a determined window of time. The PF is a metric that captures the relative importance of serving one terminal device versus another terminal device. On a cell level, it may be used to describe fairness across terminal devices by having the terminal device's realized throughput in the denominator, and it may account for efficiency in the performance of the cell and the access node managing the cell. The numerator of the PF may be arranged to take into account different channel conditions experienced by different terminal devices. The measure for the proportional fairness may be the throughput but other measures may equally be used, e.g. latency.

In block 900, the controller acquires proportional fairness metrics for uplink and downlink from the cells of the cell cluster. In block 902, the controller determines the nominal transmission direction by selecting a transmission direction associated with a lowest aggregate proportional fairness amongst the cell cluster. The controller may sum the proportional fairness metrics associated with the same transmission direction and, then, perform the following check:

$$\Sigma_{k \in Ci} PF_k^d \geq \Sigma_{k \in Ci} PF_k^u \quad (7)$$

where the left hand side represents the sum of proportional fairness metrics for the downlink, and the right hand side represents the sum of proportional fairness metrics for the uplink in the cell cluster.

In an embodiment, the value $PF_k^x$ is the maximum of the proportional fairness metrics amongst the terminal devices in the cell k for the transmission direction x. In another embodiment, the value $PF_k^x$ is the average of the proportional fairness metrics across the terminal devices in the cell k for the transmission direction x as:

$$PF_k^x = \frac{\sum_{j=1}^{n_k^x} PF_{k,j}^x}{n_k^x} \quad (8)$$

where $n_k^x$ represents the number of active terminal devices in the transmission direction x ($x \in \{u, d\}$).

In the embodiment of FIG. 9, the traffic asymmetry metric represents a relation between uplink proportional fairness and downlink proportional fairness in the cell, and wherein the controller selects the first transmission direction when the relation indicates difference greater than a determined degree defined by the threshold. The controller may determine an uplink proportional fairness value and a downlink proportional fairness value for the cell I (block 904) and compare the relation of the uplink proportional fairness value and the downlink proportional fairness value with the threshold. The relation may be a difference or a ratio, for example. If the comparison indicates that the proportional fairness is significantly poorer for the opposite transmission direction than for the nominal transmission direction, e.g. the value of the PF is significantly larger for the opposite transmission direction, the controller may violate the nominal transmission direction and select the opposite transmission direction. The degree of significance is controlled with the value of the threshold against which the relation is compared.

As described above, different cells 1 to 13 may select different transmission directions for the time interval because. This may result from the fact that unique cell clusters are determined for each cell (the liquid cell cluster concept). However, since each cell considers the traffic condition metrics of the neighboring cell(s) and neighboring cells have typically some of the same cells in their cell clusters, there is typically correlation in the selection of the nominal transmission direction. The degree of correlation in the selection of the actual transmission direction may then be controlled by the value(s) of the threshold(s). The neighboring cells may also use the same type of traffic condition metrics when making the decision, e.g. the number of active terminal devices.

In all embodiments, upon selecting the transmission direction, the controller may output the selected transmission direction so as to execute the selected transmission direction in the cell. The access node of the cell may then control transmission to the selected transmission in the cell during the time interval. For example, the access node may allocate downlink data to time-frequency resources of the time interval, when the selected transmission direction is downlink. If the selected transmission direction is uplink, the access node may schedule uplink resources to terminal devices of the cell to the time-frequency resources of the time interval.

The controller may also output a notification of the selected transmission direction to the other cells of the cell cluster. Accordingly, the neighboring cells may take the transmission direction into account. For example, if the controller has selected a transmission direction that is different from a transmission direction selected for a neighboring cell, the access node of the neighboring cell may take measures to reduce the effect of possible increased interference. Such measures may include selection of more reliable link adaptation parameters such as a modulation and coding scheme.

In all embodiments, when the traffic asymmetry metric equals to the threshold, one of the nominal transmission direction and the opposite transmission direction may be selected, depending on the implementation.

Figure 10:
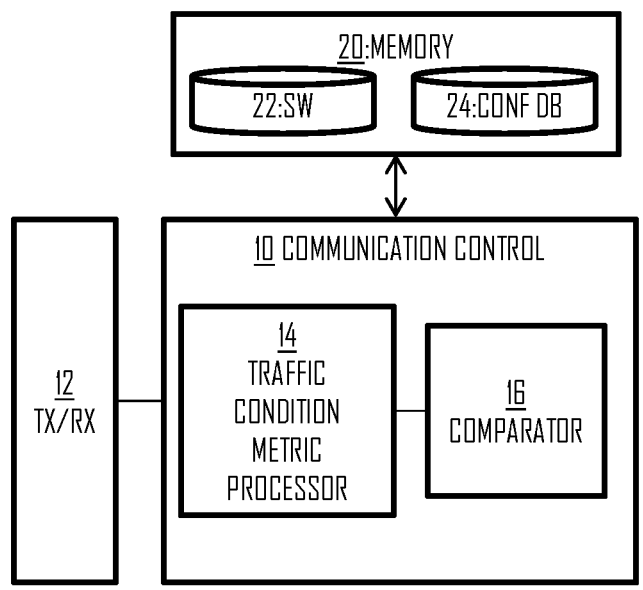
FIG. 10 illustrates a block diagram of an apparatus according to an embodiment of the invention.

FIG. 10 illustrates a block diagram of an apparatus according to an embodiments of the invention. The apparatus of FIG. 10 may be a computer or an access node, or the apparatus may be comprised in any one of such devices. The apparatus may be, for example, a circuitry or a chipset in such a device. The apparatus may also be a distributed computer system realized by multiple physically separate computers, e.g. a cloud computing system. The apparatus may be an electronic device comprising electronic circuitries.

Referring to FIG. 10, the apparatus may comprise a communication control circuitry 10 such as at least one processor, and at least one memory 20 including a computer program code (software) 22 wherein the at least one memory and the computer program code (software) are configured, with the at least one processor, to cause the apparatus to carry out any one of the embodiments of the controller described above.

The memory 20 may be implemented using any suitable data storage technology, such as semiconductor based memory devices, flash memory, magnetic memory devices and systems, optical memory devices and systems, fixed memory and removable memory. The memory may comprise a configuration database 24 for storing configuration data for use in the selection of the transmission direction for one or more cells. For example, the configuration database 24 may store the threshold(s) described above.

The apparatus may further comprise a communication interface (TX/RX) 12 comprising hardware and/or software for realizing communication connectivity according to one or more communication protocols. The communication interface 12 may provide the apparatus with communication capabilities to communicate in a cellular communication system and/or in another wireless network. The communication interface 12 may configure the apparatus with capability of receiving the traffic condition metrics from access nodes of the cells of the cell cluster, including or excluding cell i. The communication interface 12 may comprise standard well-known components such as an amplifier, filter, frequency-converter, (de)modulator, and encoder/decoder circuitries and one or more antennas. The communication interface 12 may comprise radio interface components providing the apparatus with radio communication capability in one or more wireless networks.

The communication control circuitry 10 may comprise, as a sub-circuitry, a traffic condition metric processor 14 configured to acquire the traffic condition metrics for the cell cluster. The traffic condition metric processor 14 may receive at least some of the traffic condition metrics through the communication interface 12. Access nodes of the cellular communication system may be inter-connected via backhaul links, e.g. an X2 interface of the LTE system. When the apparatus is the access node of cell i or comprised in the access node, the traffic condition metric processor 14 may acquire the traffic condition metric(s) for cell i internally and not through the communication interface 12. The traffic condition metric processor 14 may then compute any one of the above-described Equations by using the acquired traffic condition metrics, depending on the embodiment. The traffic condition metric processor 14 may also compute the traffic asymmetry metric for use in the selection of the transmission direction.

The traffic condition metric processor 14 may output the traffic condition metrics to a comparator 16 for making the decision about the nominal transmission direction. The traffic condition metric processor 14 may output the traffic asymmetry metric(s) to the comparator 16 for making the decision about the selected transmission direction according to any one of the above-described embodiments.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 2 to 9 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A computer-implemented method, comprising:
   determining, by a controller associated with a cell of a cellular communication system, a traffic asymmetry metric for the cell, the traffic asymmetry metric representing asymmetry between uplink and downlink traffic in the cell;
   comparing, by the controller, the traffic asymmetry metric with a threshold;
   upon determining, by the controller on the basis of the comparison, that the traffic asymmetry metric is greater than the threshold, selecting a first transmission direction for a time interval;
   upon determining, by the controller on the basis of the comparison, that the traffic asymmetry metric is not greater than the threshold, selecting for the time interval a second transmission direction different from the first transmission direction, wherein the second transmission direction is a nominal transmission direction determined as common to a cell cluster comprising the cell and a set of neighboring cells, and wherein the controller determines the nominal transmission direction on the basis of traffic condition metrics acquired for the cell and for the set of neighboring cells; and
   causing data communication to the selected transmission direction in the cell during the time interval.

2. An apparatus, comprising:
   at least one processor; and
   at least one memory including a computer program code, wherein the at least one memory and the computer program code are configured, with the at least one processor, to cause the apparatus to:
   determine a traffic asymmetry metric for a cell of a cellular communication system, the traffic asymmetry metric representing asymmetry between uplink and downlink traffic in the cell;
   compare the traffic asymmetry metric with a threshold;
   upon determining, on the basis of the comparison, that the traffic asymmetry metric is greater than the threshold, selecting a first transmission direction for a time interval;

upon determining, on the basis of the comparison, that the traffic asymmetry metric is not greater than the threshold, select for the time interval a second transmission direction different from the first transmission direction, wherein the second transmission direction is a nominal transmission direction determined as common to a cell cluster comprising the cell and a set of neighboring cells, and wherein the controller determines the nominal transmission direction on the basis of traffic condition metrics acquired for the cell and for the set of neighboring cells; and cause data communication to the selected transmission direction in the cell during the time interval.

3. The apparatus of claim 2, wherein the traffic condition metrics represent asymmetry between uplink and downlink traffic demand.

4. The apparatus of claim 2, wherein the traffic condition metrics indicate a preference transmission direction for each cell of the cell cluster, and wherein the at least one memory and the computer program code are configured, with the at least one processor, to cause the apparatus to determine the nominal transmission direction by performing at least the following:

combining the traffic condition metrics; and determining, as the nominal transmission direction, a transmission direction indicated as a preference transmission direction by the combined traffic condition metrics.

5. The apparatus of claim 4, wherein the traffic condition metrics comprise uplink traffic condition metrics and downlink traffic condition metrics, wherein the at least one memory and the computer program code are configured, with the at least one processor, to cause the apparatus to perform said combining by at least combining the uplink traffic condition metrics and further combining the downlink condition metrics, and to perform said determining the transmission direction by at least comparing the combined downlink traffic condition metrics with the combined uplink traffic condition metrics.

6. The apparatus of claim 2, wherein the at least one memory and the computer program code are configured, with the at least one processor, to cause the apparatus to determine the traffic asymmetry metric by using an uplink traffic condition metric of the cell and a downlink traffic condition metric of the cell, wherein the uplink traffic condition metric represents traffic demand in uplink in the cell and the downlink traffic condition metric represents traffic demand in downlink in the cell.

7. The apparatus of claim 2, wherein each traffic condition metric represents a buffered data amount associated with a transmission direction in a cell.

8. The apparatus of claim 7, wherein the at least one memory and the computer program code are configured, with the at least one processor, to cause the apparatus to determine the nominal transmission direction by at least selecting a transmission direction for which a larger amount of buffered data is determined to be present in the cell cluster.

9. The apparatus of claim 7, wherein the traffic asymmetry metric represents asymmetry between an amount of buffered uplink data and an amount of buffered downlink data in the cell, and wherein the at least one memory and the computer program code are configured, with the at least one processor, to cause the apparatus to select the first transmission direction when the asymmetry is greater than a determined degree defined by the threshold.

10. The apparatus of claim 1, wherein each traffic condition metric represents presence or absence of data traffic associated with a transmission direction in a cell.

11. The apparatus of claim 10, wherein the at least one memory and the computer program code are configured, with the at least one processor, to cause the apparatus to determine the nominal transmission direction by at least selecting a transmission direction for which a greater number of traffic condition metrics indicates presence of data traffic in the cell cluster.

12. The apparatus of claim 10, wherein the traffic asymmetry metric represents asymmetry between presence of uplink data traffic and downlink data traffic in the cell, and wherein the at least one memory and the computer program code are configured, with the at least one processor, to cause the apparatus to select the first transmission direction when the asymmetry is greater than a determined degree defined by the threshold.

13. The apparatus of claim 2, wherein each traffic condition metric represents a number of active terminal devices having traffic associated with a transmission direction in a cell.

14. The apparatus of claim 13, wherein the at least one memory and the computer program code are configured, with the at least one processor, to cause the apparatus to determine the nominal transmission direction by at least selecting a transmission direction associated with a greater number of active terminal devices in the cell cluster.

15. The apparatus of claim 13, wherein the traffic asymmetry metric represents asymmetry between a number of active terminal devices having uplink data traffic a number of active terminal devices having downlink data traffic in the cell, and wherein the at least one memory and the computer program code are configured, with the at least one processor, to cause the apparatus to select the first transmission direction when the asymmetry is greater than a determined degree defined by the threshold.

16. The apparatus of claim 2, wherein each traffic condition metric represents a smallest lifetime amongst buffered data packets associated with a transmission direction in a cell.

17. The apparatus of claim 16, wherein the at least one memory and the computer program code are configured, with the at least one processor, to cause the apparatus to determine the nominal transmission direction by at least selecting a transmission direction associated with a smallest aggregate lifetime of buffered data packets in the cell cluster, wherein the smallest aggregate lifetime is computed as an aggregate of the traffic condition metrics associated with the same transmission direction.

18. The apparatus of claim 16, wherein the traffic asymmetry metric represents a relation between the smallest lifetime amongst uplink data packets and the smallest lifetime amongst downlink data packets in the cell, and wherein the at least one memory and the computer program code are configured, with the at least one processor, to cause the apparatus to select the first transmission direction when the relation indicates difference greater than a determined degree defined by the threshold.

19. The apparatus of claim 2, wherein each traffic condition metric represents a proportional fairness associated with a transmission direction in a cell, wherein the proportional fairness represents a grade of service provided by the cell in a determined time interval with respect to a maximum achievable grade of service in the cell in the determined time interval.

20. A computer program product embodied on a non-transitory computer-readable medium, said computer program product comprising computer readable instructions which, when executed by the computer, cause the computer to execute a method, comprising:
  determining a traffic asymmetry metric for the cell, the traffic asymmetry metric representing asymmetry between uplink and downlink traffic in the cell;
  comparing the traffic asymmetry metric with a threshold;
  upon determining, on the basis of the comparison, that the traffic asymmetry metric is greater than the threshold, selecting a first transmission direction for a time interval;
  upon determining, on the basis of the comparison, that the traffic asymmetry metric is not greater than the threshold, selecting for the time interval a second transmission direction different from the first transmission direction, wherein the second transmission direction is a nominal transmission direction determined as common to a cell cluster comprising the cell and a set of neighboring cells, and wherein the controller determines the nominal transmission direction on the basis of traffic condition metrics acquired for the cell and for the set of neighboring cells; and
  causing data communication to the selected transmission direction in the cell during the time interval.

* * * * *